(12) United States Patent
Varekamp

(10) Patent No.: US 12,430,836 B2
(45) Date of Patent: Sep. 30, 2025

(54) DEPTH SEGMENTATION IN MULTI-VIEW VIDEOS

(71) Applicant: KONINKLIJKE PHILIPS N.V., Eindhoven (NL)

(72) Inventor: Christiaan Varekamp, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 132 days.

(21) Appl. No.: 18/564,787

(22) PCT Filed: May 25, 2022

(86) PCT No.: PCT/EP2022/064243
§ 371 (c)(1),
(2) Date: Nov. 28, 2023

(87) PCT Pub. No.: WO2022/253677
PCT Pub. Date: Dec. 8, 2022

(65) Prior Publication Data
US 2024/0378789 A1   Nov. 14, 2024

(30) Foreign Application Priority Data

Jun. 3, 2021   (EP) .................................... 21177608

(51) Int. Cl.
*G06T 17/20*   (2006.01)
*G06T 3/18*   (2024.01)
(Continued)

(52) U.S. Cl.
CPC ................ *G06T 15/00* (2013.01); *G06T 3/18* (2024.01); *G06T 5/50* (2013.01); *G06T 7/194* (2017.01);
(Continued)

(58) Field of Classification Search
None
See application file for complete search history.

(56) References Cited

U.S. PATENT DOCUMENTS

2012/0170833 A1   7/2012   Kokojima et al.
2012/0236114 A1   9/2012   Chang et al.
(Continued)

FOREIGN PATENT DOCUMENTS

| CN | 109147025 A | 1/2019 |
| CN | 110148217 A | 8/2019 |
| WO | 2021067501 A1 | 4/2021 |

OTHER PUBLICATIONS

International Search Report and Written Opinion from PCT/EP2022/064243 mailed Sep. 21, 2022.
(Continued)

*Primary Examiner* — Carl Adams

(57) ABSTRACT

A method of depth segmentation for the generation of a multi-view video data. The method comprises obtaining a plurality of source view images and source view depth maps representative of a 3D scene from a plurality of sensors. Foreground objects in the 3D scene are segmented from the source view images and/or the source view depth maps. One or more patches are then generated for each source view image and source view depth map containing at least one foreground object, wherein each patch corresponds to a foreground object and wherein generating a patch comprises generating a patch texture image, a patch depth map and a patch transparency map based on the source view images and the source view depth maps.

20 Claims, 6 Drawing Sheets

(51) Int. Cl.
  *G06T 5/00* (2024.01)
  *G06T 5/50* (2006.01)
  *G06T 7/194* (2017.01)
  *G06T 7/50* (2017.01)
  *G06T 15/00* (2011.01)
  *G06V 10/25* (2022.01)
  *G06V 10/75* (2022.01)

(52) U.S. Cl.
  CPC ............... *G06T 7/50* (2017.01); *G06V 10/25* (2022.01); *G06V 10/751* (2022.01); *G06T 2207/20221* (2013.01); *G06T 2207/20224* (2013.01)

(56) References Cited

U.S. PATENT DOCUMENTS

| | | | |
|---|---|---|---|
| 2015/0085933 A1 | 3/2015 | Yie et al. | |
| 2019/0037150 A1 | 1/2019 | Srikanth et al. | |
| 2019/0320164 A1 | 10/2019 | Salahieh et al. | |
| 2024/0096020 A1* | 3/2024 | Yu | G06T 7/194 |

OTHER PUBLICATIONS

J. Shade et.al. Layered Depth Images. Siggraph 1998. [https://www.microsoft.com/en-us/research/wp-content/uploads/2016/02/Shade-SG98.pdf].

M. Broxton et.al. Immersive Light Field Video with a Layered Mesh Representation. Siggraph 2020. [https://augmentedperception.github.io/deepviewvideo/].

Levin et.al. A Closed Form Solution to Natural Image Matting. IEEE Transactions on Pattern Analysis and Machine Intelligence (vol. 30, Issue: 2, Feb. 2008). [https://people.csail.mit.edu/alevin/papers/Matting-Levin-Lischinski-Weiss-CVPR06.pdf].

Loghman Maiar et al "Segmentation-Based View Synthesis for Multi-view Video Plus Depth" Multimedia Tools and Applications, Kluwer Academy Publishers, vol. 64, No. 5 Nov. 8, 2013.

Diaz Rodrigo et al "Region Dependent Mesh Refinement for Volumetric Video Workflows" 2019 Int. Conf. on 3D Immersion, Dec. 11, 2019 p. 1-8.

* cited by examiner a)

b)

DEPTH SEGMENTATION IN MULTI-VIEW VIDEOS

CROSS-REFERENCE TO PRIOR APPLICATIONS

This application is the U.S. National Phase application under 35 U.S.C. § 371 of International Application No. PCT/EP2022/064243, filed on May 25, 2022, which claims the benefit of EP Patent Application No. EP 21177608.3, filed on Jun. 3, 2021. These applications are hereby incorporated by reference herein.

FIELD OF THE INVENTION

The invention relates to the field of multi-view videos. In particular, the invention relates to depth segmentation for the generation of multi-view videos and rendering multi-view videos.

BACKGROUND OF THE INVENTION

Existing approaches that render from multi-view image with depth combine the warped textures from multiple source view (capture) cameras using blending. The blending operation can depend on variables such as source and target camera position/orientation (e.g. ray angle differences), depth magnitude, depth variation, de-occlusion, transparency and color. More advanced techniques even use a trained convolutional neural network to align textures in the target viewpoint. There are several formats for storing multi-view images.

Layered Depth Images (LDI) store a set of depth pixels (not just one) along a single line of sight. When the virtual viewpoint moves away from the LDI storage viewpoint then the occluded surfaces become visible.

Multi Plane Image (MPI) and Multi Sphere Image (MSI) techniques construct color and transparency for a predefined set of planes or spheres in 3D space. For a new virtual viewpoint, the image is then constructed using back-to-front over-compositing of the layers.

Layered Meshes (LM) can be constructed from MPI and MSI and represent traditional graphics meshes with texture and are hence suitable for atlas construction and transmission using existing video codecs.

While the layered formats (LDI, MPI, MSI, LM) can potentially bring a larger viewing zone due to the explicit occlusion handling, these formats are difficult to produce, especially in real-time, from a multi-camera system.

Loghman Maziar et al. "Segmentation-based view synthesis for multi-view video plus depth", Multimedia Tools and Applications, Kluwer Academy Publishers Boston vol. 74, no. 5, 8 Nov. 2013 discloses a method for image synthesis by segmenting objects from source images and warping the segmented objects individually.

SUMMARY OF THE INVENTION

The invention is defined by the claims.

According to examples in accordance with an aspect of the invention, there is provided a method of depth segmentation for the generation of a multi-view video data, the method comprising:

obtaining a plurality of source view images and source view depth maps representative of a 3D scene from a plurality of sensors;

segmenting foreground objects in the 3D scene from the source view images and/or the source view depth maps; and generating one or more patches for each source view image and source view depth map containing at least one foreground object, wherein each patch corresponds to a foreground object and wherein generating a patch comprises generating a patch texture image, a patch depth map and a patch transparency map based on the source view images and the source view depth maps.

Typical formats for multi-view video require significant processing power to generate (e.g. layered depth images, multi-plane images etc.) due to the complex analysis that is typically required to estimate a depth value for each pixel. For instance, the inability of finding a robust algorithm to do this has resulted in increased use of data driven approaches based on deep learning. This problem is particularly present in the broadcast of multi-view videos such as live sporting events, as the creation of depth and texture atlas data, for data reduction, must be done in real time for each frame.

Thus, the inventor has proposed to "segment" patches from the source views (i.e. images and depth maps) containing the foreground objects. Thus, an atlas would only contain data from patches (and from the background) instead of data for all of the source views. Each patch is based on a section of a source view image which is smaller than the source view image itself and the corresponding depth and transparency data for the section. In other words, each patch functions as a partial source view with texture, transparency and depth data corresponding to a foreground object used to render a scene instead of using source views corresponding to arbitrary parts of the scene. Patches may overlap one another. Different patches may have the same size or they may have different sizes (e.g. depending on their corresponding foreground objects). In some cases, different patches may have identical patch texture images and patch depth maps if, for example, they are based on the same section of a source view image (e.g. when a particular section includes more than one foreground object).

Various methods exist for segmenting the foreground objects from either the source view images or the source view depth maps. For example, segmentation algorithms or object detection algorithms may be used on the source view images to detect/segment the foreground objects. Alternatively, depth differences (above a threshold) in the source view depth maps may be calculated such that the edge of a foreground object can be defined by the large depth differences. For multi-view video, the difference between frames (of either the source view images or source view depth maps) can be used to detect movement of a foreground object and thus detect the foreground object.

Patches can thus be generated for the foreground objects in each source view. Each patch corresponds to a single foreground object. In particular, the extent of the patch may be determined, at least in part, by the extent of the object (or a part of the object). However, a foreground object may have more than one corresponding patch. Alternatively, each foreground object may be associated with a single patch. The patches have a patch texture image which includes the texture/color data for the patch and a patch depth map which includes the depth data for the patch. The patches also have a patch transparency map (also called a patch alpha map) which includes the transparency values of each pixel in the patch.

The method may further comprise obtaining a plurality of background depth maps of the 3D scene representative of the background of the 3D scene, a background depth map containing depth data of the background from a particular orientation, wherein segmenting foreground objects is based on the difference between a background depth map and a corresponding source view depth map.

When segmenting based on, for example, source view images by themselves, it is likely that the patches generated would bleed across depth boundaries. This could cause problems in the encoding or later rendering. Thus, by using the background depth maps, the foreground object can be robustly segmented and these problems may be avoided.

The background depth map for each source view can be obtained by fitting a pre-defined geometric scene model to a subset of the source views. For example, assuming that the background consists of a horizontal ground surface plane and a vertical background plane, these planes can be initially placed and shifted/rotated with respect to each other and the cameras such that an image based multi-view matching criterion is minimized. After fitting the pre-defined geometric scene to a subset of the source views, a background depth map can be rendered for each source view.

The background depth map comprises depth data of the background of the 3D scene. For example, the background depth map may be generated based on the views of a plurality of cameras imaging the 3D scene from different angles. The background depth map may be generated from a different set cameras than the ones used to obtain the source views. For example, if the 3D scene is a soccer field, cameras on the side of the soccer field may be used to image the foreground objects (i.e. the players and the ball) and cameras viewing the soccer field from the top (e.g. top down cameras) may be used to generate the background depth map.

The foreground objects can be segmented by thresholding the difference between the source view depth maps and the background depth map for each source view. After this global threshold, a second, local, thresholding may be applied to separate connected foreground objects based on a relative depth step.

A trained human person detection algorithm can be used to detect foreground objects. A ball detector can be used to detect the ball in a sports game. Motion estimation or temporal frame differencing can be used to further improve foreground object detection.

The method may further comprise obtaining a background model comprising the background depth map and background texture data.

The method may further comprise generating an atlas based on the patch texture images, the patch depth maps, the patch transparency maps and the background model. For example, the atlas may contain the patch texture images, the patch depth maps, the patch transparency maps and the background model.

An atlas is, in essence, a data matrix which contains various images and/or maps (e.g. texture, depth and transparency data). In order to find an image or map in the atlas, the "coordinates" of each image are specified (i.e. the column and row values for the matrix). Thus, the atlas contains data from multiple source views.

Typically, the patch data is all separately contained in the atlas. However, it is also possible to define, for example, the patch transparency maps in binary (i.e. transparency values of zero or one) and coded via a reserved value in the depth map.

Detecting foreground objects may comprise subtracting the respective background depth maps from the source view depth maps, to produce difference images, and thresholding the difference images, wherein thresholding comprises comparing the pixel values of the difference images with a threshold value, to produce threshold maps, thereby to differentiate between the background and the foreground objects. Pixels in the source view depth maps corresponding to depth steps are identified, wherein depth steps are defined by the differences between neighboring depth values in a source view depth map being larger than a depth threshold value. All the depth values corresponding to the depth steps are adjusted in the threshold maps thereby to differentiate the foreground objects from each other and bounding boxes are generated for the foreground objects based on the adjusted threshold maps.

Thresholding the difference image may result in a binary map where the pixel value "1" means foreground and "0" means background. To identify foreground objects, connected components are identified via a 4-connected or 8-connected component labelling algorithm. Doing this immediately after the initial thresholding operation would result in multiple foreground objects being falsely identified as a single object. To avoid this, the spatial derivative of the original source view depth map, for example, is analyzed. When a depth step exceeds a "depth threshold", then the binary map is set to "0" (i.e. background) on the further side of the step. When the resulting binary map is input to the connected component labelling algorithm, then the foreground objects can receive different labels.

The size and position of a patch may be based on the size and position of a bounding box.

The depth values of the background depth map are subtracted from the source view depth maps in order to make all values zero (or close to zero) apart from the foreground objects present in the source view depth maps. The subtracted maps are then thresholded based on a "threshold value" in order to, for example, set all of the depth values corresponding to the background to zero (or black) and all of the depth values corresponding to the foreground objects to one (or white).

Depth steps are also identified in the source view depth maps. The depth steps correspond to large changes in depth for adjacent/neighboring pixels which indicate the edges of the foreground objects. The depth steps can be identified by the difference between neighboring depth values being larger than a depth threshold value (e.g. larger than 0.1 in a normalized depth map).

The depth values of the threshold maps can then be adjusted at the depth steps to be, for example, zero (or black) in order to highlight and distinguish the edges of each foreground object. A bounding box is generated for each foreground object based on the adjusted threshold maps (e.g. segmenting the foreground objects in the adjusted threshold maps).

The size and position of a patch could be the size and position of the bounding box. Alternatively, multiple patches could be generated for a bounding box. For example, the number of patches per bounding box may depend on the size of the bounding box, the type of foreground object, the position of the foreground object etc.

Detecting foreground objects may further comprise extending the bounding boxes thereby to include regions of the foreground objects in the subtracted maps below the threshold value.

For example, extending the bounding boxes may be based on the difference between the source view depth map and the background depth map being less than the threshold value for regions which include a foreground object, wherein the bounding boxes are extended such that each foreground object is enclosed by a bounding box.

In some instances, the foreground object may have parts which have a depth value similar to the depth value of the background. Thus, during the thresholding, the foreground object will look smaller and the bounding box may not fully enclose the foreground object in the source views.

For example, the feet of a soccer player have a similar depth to the soccer field they are standing on. In these cases, the bounding boxes are extended (for example, extended downwards) such that the bounding box(es) corresponding to the foreground object fully enclose the foreground object.

Generating a patch texture image and a patch transparency map may be based on alpha matting the source view images. Alpha matting is based on extracting the foreground from an image. Thus, the texture and transparency (alpha values) of each pixel of a patch can be estimated using alpha matting.

The method may further comprise adapting pixel depth values of the patch depth maps such that all of the pixel depth values of a patch depth map consist of values equal to or lower than the depth values of the corresponding foreground object.

For the sake of consistency and clarity, any depth maps defined in this application will be constructed such that a maximum value (e.g. 255) represents the closest distance to a viewpoint (i.e. smallest depth value) and a minimum value (e.g. 0) represent the furthest distance (i.e. highest depth value). Any mention of "lower" or "higher" in this application with respect to the value of the pixels in a depth map should be interpreted with respect to the aforementioned definition. However, it must be noted that any other format of representing depth maps could also be used and will be known to the person skilled in the art. For example, a "0" pixel may represent the closest distance and a "1" value may represent the furthest.

Some patch depth maps may contain depth data from other foreground objects occluding the corresponding foreground object. The "unwanted" (or left-over) depth data may cause artefacts when rendering the foreground objects. Thus, it may be beneficial to adapt the pixel depth values of the patch depth map (i.e. change the pixel values) such that all of the pixel depth values are equal to or higher than the depth values of the target foreground object (i.e. the foreground object corresponding to the patch depth map in question).

Additionally, the method may further comprise identifying a plurality of patches originating from different source views corresponding to a first foreground object based on identifying the patch depth maps of the identified patches within an object depth range and correcting the identified patch depth maps such that they correspond to an object location in the 3D scene.

For example, the patch depth maps can be corrected (e.g. filtered) by projecting the centroid locations of the patch depth maps of all views to a common world coordinate system. Patches from different source views that map to similar world space coordinates (i.e. within a given inter-object distance) likely originate from one and the same physical foreground object. Patch depth maps can hence be corrected (i.e. made to have more similar world space coordinate). After correcting, a back-projection to the source view results in a filtered depth map per patch.

The method may further comprise pruning the patches based on measuring the consistency between patches in multiple source views. For example, the method may comprise filtering a particular patch to possibly remove it in case there are not enough corresponding patches in other source views (indicating that the patch is an isolated error likely as a result of estimation noise).

This may help in identifying falsely detected foreground patches. For example, after projecting a patch to a common world coordinate system the number of patches from other source views closer than a minimum world-space (Euclidean) distance of the patch may be calculated. If this number is lower than a patch number threshold (e.g. a given fraction of the number of source views) then the patch is discarded. For example, if a "foreground object" is only identified in less than three of eight source views, the patches for that particular foreground object are discarded. If the patch is discarded it will not be used in the atlas.

Generating one or more patches may comprise identifying a sub-region in a source view depth map, determining a number of depth surfaces of different depths present in the sub-region and generating a patch for each depth surface in the sub-region, wherein each patch comprises a different patch transparency map.

Alternatively or additionally, generating one or more patches may comprise identifying a sub-region in a source view image.

The invention also provides a system comprising:
one or more processors comprising computer program code which, when executed on a computing device, cause the computing system to perform the aforementioned method; and
a plurality of sensors configured to obtain the source view images and source view depth maps.

The invention also provides a method for rendering multi-view videos, the method comprising:
receiving an atlas with a plurality of patches and a background model of a 3D scene, wherein each patch corresponds to a foreground object and wherein each patch comprises a patch texture image, a patch depth map and a patch transparency map derived from source view images and source view depth maps;
receiving a virtual viewpoint within the 3D scene;
sorting the patches based on the difference between the position of the virtual viewpoint and the position of the foreground objects corresponding to each patch; and
rendering the background model and the sorted patches.

The rendering method may further comprise grouping the patches based on the position of the corresponding foreground objects relative to the virtual viewpoint.

Rendering the background model and the sorted patches may comprise rendering the background model, warping and/or blending a first patch group, compositing the warped and/or blended first patch group onto the rendered background model, warping and/or blending a second patch group, wherein the position of the foreground objects corresponding to the second patch group relative to the virtual viewpoint is closer to the virtual viewpoint than the position of the foreground objects corresponding to the first patch group and compositing the warped and/or blended second patch group onto the warped and/or blended first patch group.

The method may further comprise receiving metadata comprising the position and geometry of each patch in the atlas and the position and geometry of each patch in a source view image and/or a source view depth map, wherein rendering the patches is based on both the positions and geometries.

The invention also provides a computer program product comprising computer program code which, when executed on a computing device having a processing system, cause the processing system to perform all of the steps of the method of depth segmentation for the generation of a multi-view video data and/or the method for rendering multi-view videos and a processor configured to execute the computer program code.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
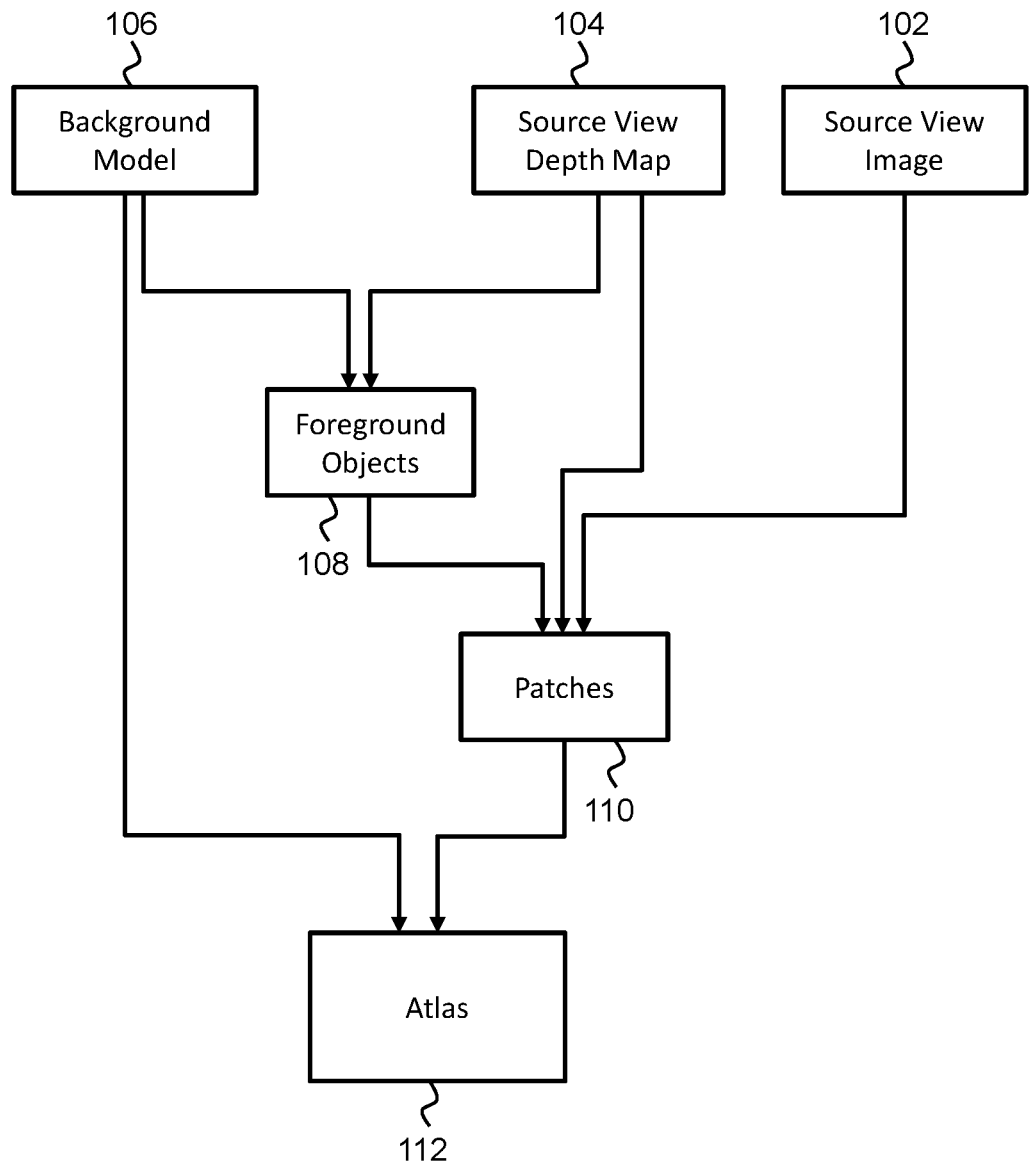
FIG. 1 shows a method of depth segmentation for multi-view videos.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method of depth segmentation for the generation of a multi-view video data. The method comprises obtaining a plurality of source view images and source view depth maps representative of a 3D scene from a plurality of sensors. Foreground objects in the 3D scene are segmented from the source view images (102) and/or the source view depth maps (104). One or more patches are then generated for each source view image and source view depth map containing at least one foreground object, wherein each patch corresponds to a foreground object and wherein generating a patch comprises generating a patch texture image, a patch depth map and a patch transparency map based on the source view images and the source view depth maps.

FIG. 1 shows a method of depth segmentation for multi-view videos. The method is based on creating an atlas 112 containing all the data necessary for rendering a multi-view video. Multiple source views are typically necessary to render a multi-view image frame. Each source view will typically have a source view image 102 and a source view depth map 104. A depth map 104 may be derived using multi-view image based matching or alternatively by adding one or more depth sensors (e.g. laser depth sensors) to the multi-camera setup (used to obtain the source view data) and then warping the measured depth in each source view after which a filtering/hole filling can be used to make the depth maps complete for each source view.

The inventor proposes to segment all source view depth maps 104 based on the difference with a globally determined background model 106. The background model 106 is used to generate a background depth map for each source view. Foreground objects 108 are then further segmented based on the relative depth differences between pixels of the background depth map and the source view depth maps 104. Instead of producing a single layered representation, segmented patches 110 of the foreground objects 108 are kept for all source views and packed together in an atlas 112.

A client device can sort the patches 110 along the z-axis of a new virtual viewpoint. The view synthesis algorithm can then visit patches 110 in this order and alternate between blending patches 110 from different source views when these patches 110 have similar depth and compositing the blended view over the previous composited output.

Figure 2:
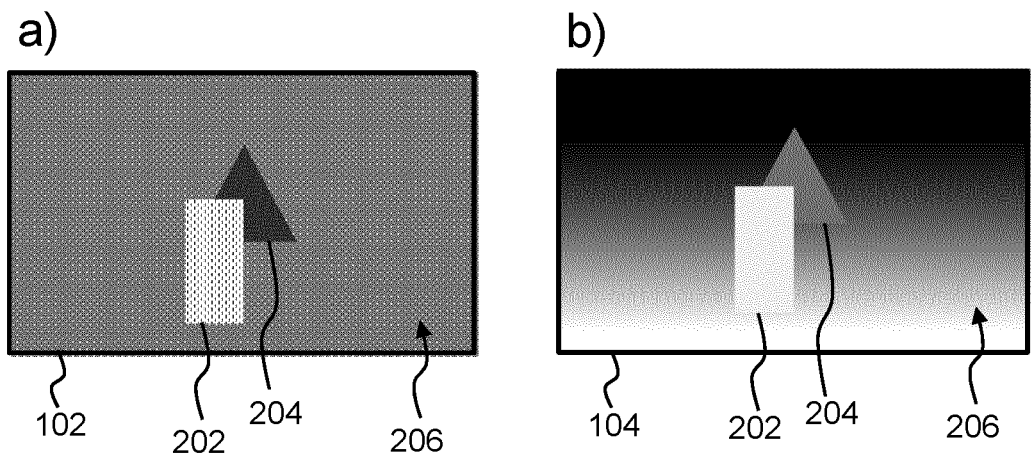
FIG. 2 shows a source view image and a source view depth map.

FIG. 2 shows a source view image 102 and a source view depth map 104. FIG. 2(a) shows the source view image 102 and FIG. 2(b) shows the source view depth map 104. The source view image 102 and the source view depth map 104 are of a 3D scene containing a background 206 and two foreground objects (i.e. the rectangle 202 and the triangle 204). As can be seen in FIG. 2(b), the depth of the background 206 varies and the depth of the two objects 202 and 204 remains constant. The lower section of the rectangular object 202 has a similar depth to the closest section of the background 206.

Figure 3:
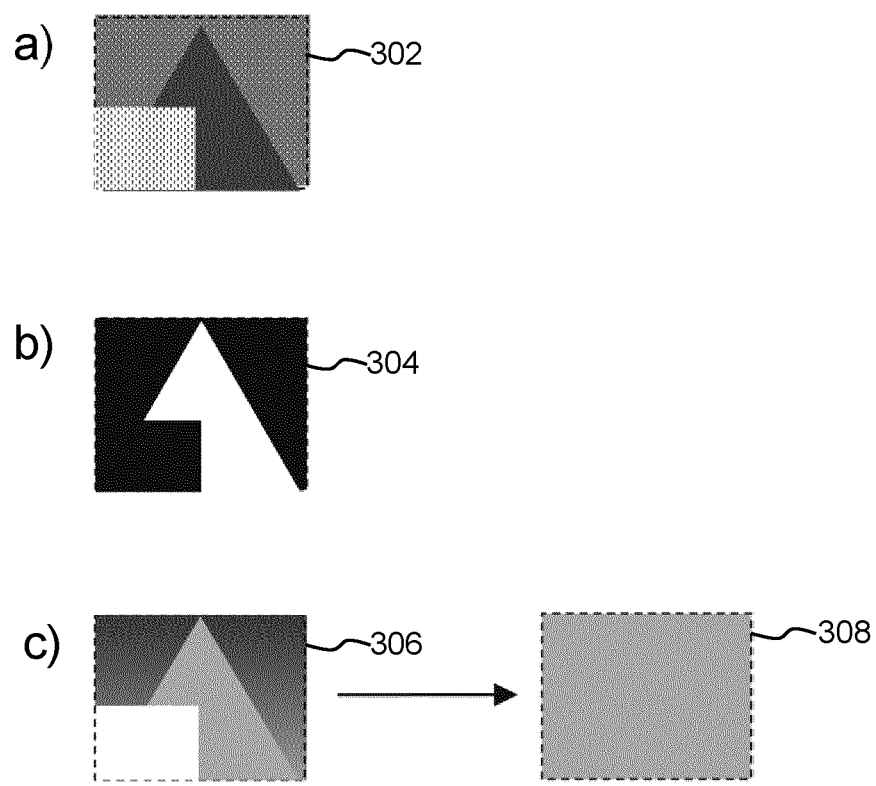
FIG. 3 shows a patch corresponding to the triangular object in FIG. 2.

FIG. 3 shows a patch 110 (as indicated in FIG. 1) corresponding to the triangular object 204 (as indicated in FIG. 1). For each patch 110, a patch texture image 302, a patch depth map 306 and a patch transparency map 304 (e.g. an alpha channel) is generated. FIG. 3(a) shows the patch texture image 302 for the triangular object 204. FIG. 3(b) shows the patch transparency map 304 corresponding to the triangular object 204 of FIG. 2, where the black sections of the patch transparency map 304 show fully transparent areas and the white sections show non-transparent areas. FIG. 3(c) shows the patch depth map 306 of the triangular object 204.

The patch texture image 302 and the patch depth map 306 can be generated by directly copying the data from the source view image 102 (FIG. 2) and the source view depth map 104 (FIG. 2) at the section corresponding to the patch 110. The transparency values can be set to one where the triangular object 204 is present and zero where it is absent.

Alternatively, a more accurate algorithm can be used to estimate, for each patch 110, the foreground color and alpha (transparency) using so called alpha matting. In that case, the color of a pixel i may be a linear combination of the local foreground color F and the background color B based on the transparency value α of the pixel:

$$I_i = \alpha_i F_i + (1 - \alpha_i) B_i$$

A trimap can be constructed based on the per pixel object component label map inside each patch 110. The trimap may consist of the classes 'definitely foreground' ($\alpha=1$), 'definitely background' ($\alpha=0$) and 'uncertain' (a needs to be estimated). The alpha matting algorithm then estimates both $\alpha_i$ and $F_i$ for the pixels that are uncertain.

If the patch depth map 306 is used for depth image based rendering, the triangle object 204 could get covered behind the 'left-over' of the rectangle (e.g. the part of the rectangle at the bottom left of FIG. 3(c)). This is because the pixels in this left-over region are closer to the camera than the pixels for the triangle object 204. This has to do with the view synthesis logic which renders the patch 110 using a triangular mesh where each vertex depends on the patch depth map 306.

To solve this problem, it may be advantageous to process the patch depth map 306 such that the 'left-over' regions of other patches 110 are changed to a depth value at least further than the local foreground of the corresponding foreground object of the patch 110. The amended patch depth map 308 in FIG. 3(c) illustrates a simple method that just sets all pixels outside the triangle object 204 to a depth value that is equal to a minimum taken over all valid object pixels. In this example, the entire amended patch depth map 308 now receives the constant depth that the triangle object 204 has. Alternatively, all pixels not corresponding to the triangle object 204 may be set to a depth value lower than any depth value corresponding to the triangle object 204.

The approach of modifying the depth pixels inside the rectangle when outside the object region, in the present example, results from the design of the client rendering system. The client rendering application will typically warp each rectangle as a single regular mesh whole (ignoring which pixels correspond to the background). Pixels outside the object region that are closer to the camera would result in the mesh folding back over the object itself.

Alternatively, a so called geometry shader could be used to select/cut triangles during rendering such that only the pixels with the object label are warped. However, this would be more complex in terms of implementation of the real-time renderer.

In case the depth of the triangle object 204 does not vary or varies only a little, then the patch depth map 306 does not need to be stored as a map and a scalar depth value can be indicated for the entire patch 110.

Figure 4:
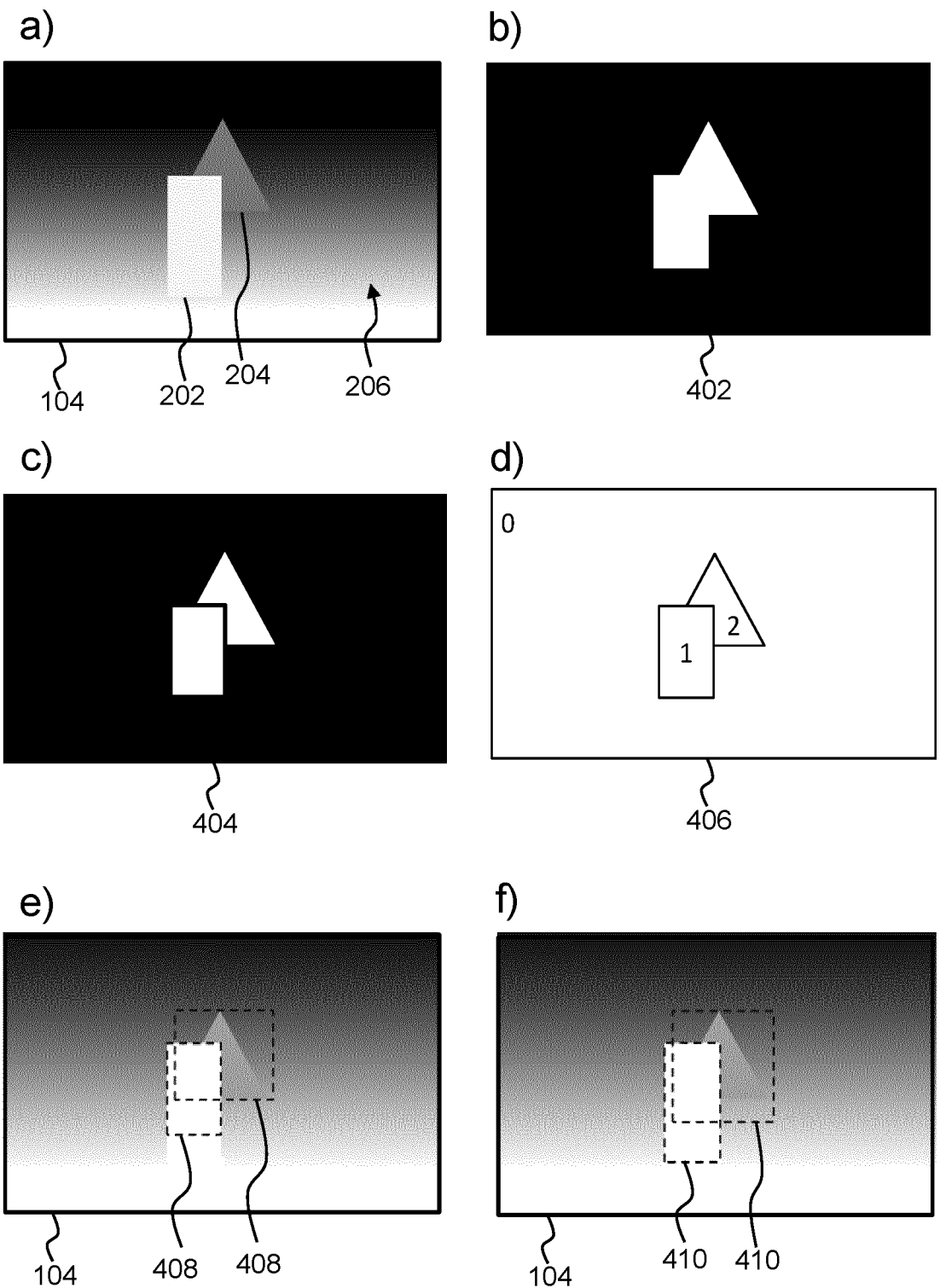
FIG. 4 illustrates a first process for generating patches.

FIG. 4 illustrates a first process for generating patches 110 (FIG. 1). Each source view is assumed to have an associated background depth map 106 (FIG. 1). For a sports stadium, this may be a depth map rendering of the ground surface model combined with a geometric model of the stadium. FIG. 4 (a) shows a source view depth map 104 with two foreground objects 202 and 204 (e.g. sports players). The foreground objects 202 and 204 can be detected by subtracting the depth of the background model 106 from the estimated source view depth map 104 followed by thresholding the result. FIG. 4(b) shows the thresholded map 402. As can be seen from FIG. 4(b), foreground objects 202 and 204 that occlude each other are still attached together in the (binary) thresholded map 402.

To separate the attached objects, depth step edge pixels are detected and set to, for example, zero. FIG. 4(c) shows a thresholded map 404 with the depth step pixels set to zero. Note that a binary mask of the local background pixels is set bounding the depth step to zero and not the pixels corresponding to the local foreground. This is done to avoid loosing foreground pixels. Consecutive connected component labelling then separates the foreground objects 202 and 204 from the background 206 and from each other into segments. FIG. 4(d) shows an image 406 with the segments labelling each object (background 206 labelled as 0, triangular object 204 labelled as 1 and rectangular object 202 labelled as 2).

Bounding boxes 408 can then detected for each segment. FIG. 4(e) shows the source view depth map 104 with the bounding boxes 408 for the foreground objects 202 and 204. Each bounding box 408 can then further be extended vertically downwards to include the rectangular object 202 section where it touches (or is near) the depth of the ground surface of the background 206. FIG. 4(f) shows the source view depth map 104 with the extended bounding boxes 410. The patches 110 can then be determined based on the bounding boxes 408 and/or the extended bounding boxes 410. Extending the bounding boxes 408 allows the bounding boxes 408 to further enclose any parts of the foreground objects 202 and 204 which were cut off at the thresholding step (e.g. due to parts of the foreground objects 202 and 204 being close to the background 206).

Figure 5:
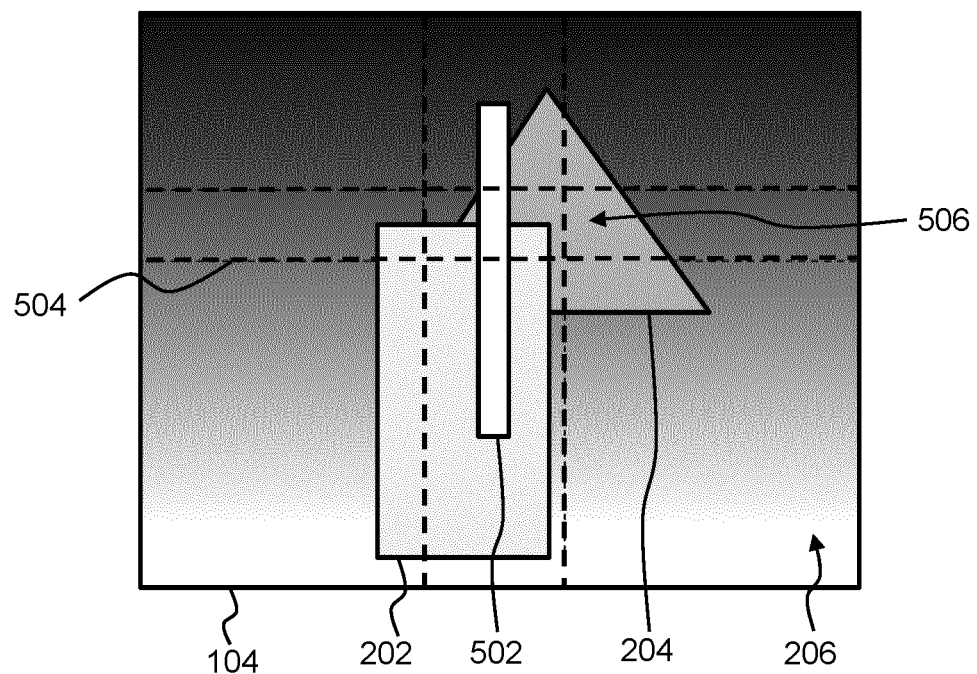
FIG. 5 shows a source view depth map with three foreground objects.

FIG. 5 shows a source view depth map 104 with three foreground objects 202, 204 and 502. A rectangular grid 504 is shown defining a sub-region 506 of the source view depth map 104 which contains all three foreground objects.

An alternative approach for the step of generating a patch 110 (FIG. 1) uses sub-regions 506 such as the sub-region 506 shown in FIG. 5. Depending on the number of depth surfaces present in the sub-region 506, one or multiple patches 110 are constructed corresponding to the sub-region 506. FIG. 5 shows an example sub-region 506 where four patches are needed to model all depth surfaces in the sub-region 506 (i.e. background 206 and three foreground objects 202, 204 and 502).

Having multiple patches per sub-region 506 allows the multiple patches to share the same patch texture image 302 and, potentially, the same patch depth map 304, thus reducing the overall amount of data that needs to be broadcast. Additionally, the spatial relationship between patches could also be defined by a grid (of sub-regions 506) instead of having to define the position of each patch.

The background depth map, as generated from the background model 106 (FIG. 1), can be used to segment the foreground objects 108 but is not essential. In the example of FIG. 5, instead of a background model, a classification, clustering and/or binning of pixels based on the depth values of the pixels in the source view depth maps 104 can be used to identify the different segments and hence produce the multiple patches per sub-region 506.

The number and position of the sub-regions 506 may depend on, for example, an object detection algorithm (or similar) detecting foreground objects in the source view images 102 (FIG. 1) or the source view depth maps 104. Alternatively, the number and position of sub-regions 506 may be fixed based on known positions of the foreground objects 202, 204 and 502.

Figure 6:
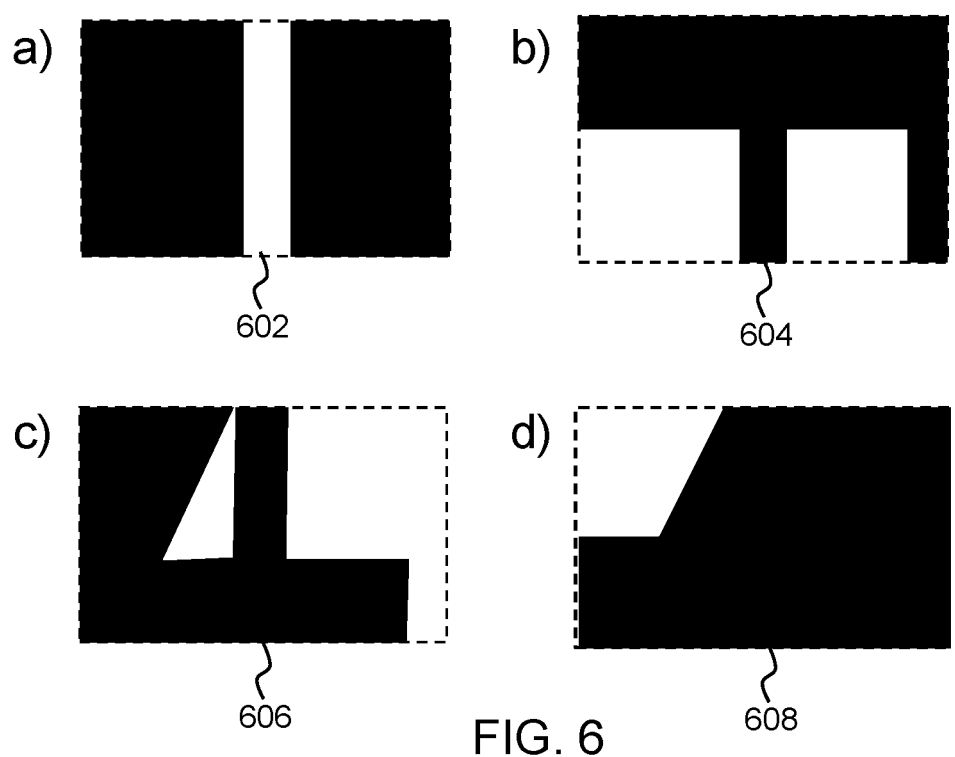
FIG. 6 shows four patch transparency maps generated for a single region.

FIG. 6 shows four patch transparency maps generated for a single sub-region 506 (FIG. 5). The four patch transparency maps 602, 604, 606 ad 608 are all for the sub-region 506 shown in FIG. 5 and each correspond to a different patch 110 (FIG. 1). In this example, four patches 110 (and thus four patch transparency maps) are generated to a single sub-region 506 due to there being four depth surfaces (background and three objects) present in the sub-region 506.

FIG. 6(a) shows a first patch transparency map 602 for the thin object 502 (FIG. 5). FIG. 6(b) shows a second patch transparency map 604 for the rectangular object 202 (FIG. 5). FIG. 6(c) shows a third patch transparency map 606 for the triangular object 204 (FIG. 5). FIG. 6(d) shows a fourth patch transparency map 608 for the background 206 (FIG. 5).

Thus, multiple patches 110 can be generated when a region of a source view depth map 104 contains multiple depth surfaces. Each surface results in a separate patch 110. Only the transparency (alpha) maps are shown in FIG. 6 as a patch texture image 302 (FIG. 3) only needs to be stored once since it is the same for all four patches 110. Additionally, for some patches 110, a scalar depth map will suffice while for other a (differential) patch depth map may be needed.

A single background model 106 (video sprite texture and depth) can be constructed from the source views by accounting for the fact that it is known where the foreground patches 110 were removed and using this to fill in any gaps. For example, when multiple cameras image a hockey game, a single background sprite image can be generated that only contains the ground and the audience but not the players. This single background sprite can be modelled via a perspective projection with a wider field of view than the source views. The background sprite and depth can be packed together with the source view patches 110 into a single atlas 112 (FIG. 1).

View Synthesis

Patch 110 view synthesis starts after decoding the atlas 112 data that contains the patch texture images 302, the patch transparency map 304 (FIG. 3) and the patch depth maps 306 (FIG. 3) of the same foreground object 108 but for multiple source views. For example, a foreground object 108 may be visible in only five of in total eight source views. The background model 106 is rendered before all other patches 110 since it is known that it is always the furthest object in the 3D scene.

Given a target view matrix (defining the position and orientation from which the 3D scene is being viewed), the patches 110 are then first sorted in decreasing order based on the distance (z-axis) from the virtual viewpoint. The sorted patches then form patch groups where the z-coordinate variation within a group is typically smaller than the z-coordinate variation between patch groups. Note that patches 110 from multiple source views will end up in the same group depending on the virtual viewpoint.

View synthesis then alternates between warping and/or blending a patch group and compositing the blended result onto the previous compositing result.

Figure 7:
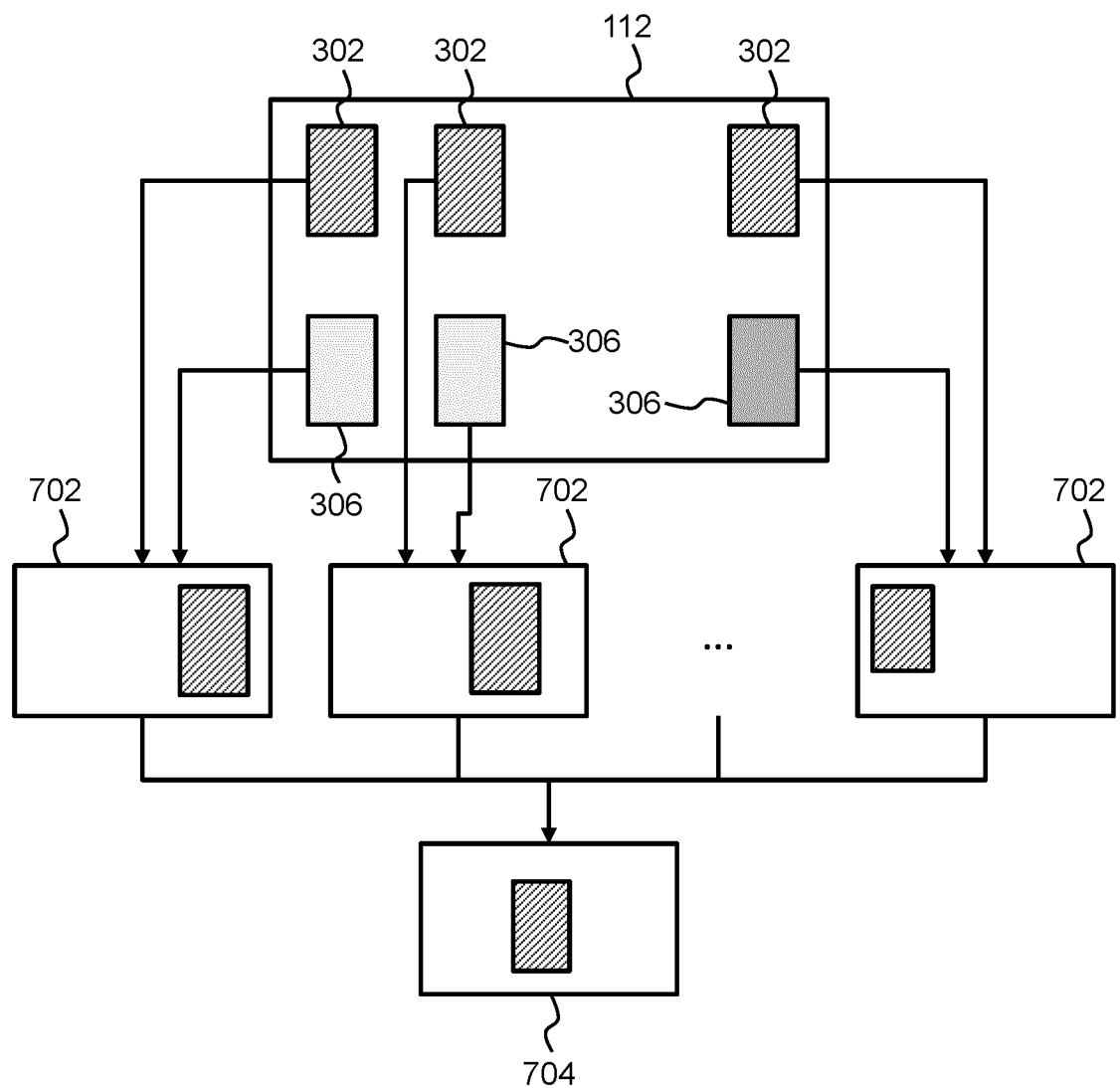
FIG. 7 illustrates the step of warping and blending a patch group from the atlas.

FIG. 7 illustrates the step of warping and blending a patch group from the atlas 112. After fetching a patch 110 as shown in FIG. 1 (i.e. the patch texture image 302, the patch transparency map 304 (FIG. 3) and the patch depth map 306) in the patch group from the atlas 112, the patch 110 is warped to its associated source view buffer using the target view matrix. The result is hence directly represented into the target view image coordinates.

For illustrative purposes, only the patch texture images 302 and the patch depth maps 306 are shown in the atlas 112. The patch transparency maps 304 may also be included in the atlas 112 or may be embedded in, for example, the patch depth maps 306.

Each patch 110 is warped to its associated source view buffer 702 and all (or some) of the source view buffers 702 are used to composite the foreground object(s) 108 corresponding to the patch group onto either the background model 106 (FIG. 1) if no other patch groups composited or onto the previously composited image 704 (if patch group already composited).

The number of source view buffers 702 used to composite the foreground object(s) 108 (FIG. 1) may be fixed in order to maintain a constant memory use during compositing. For example, only eight of the source view images (based on proximity of source view to target view) may be selected to perform compositing.

Figure 8:
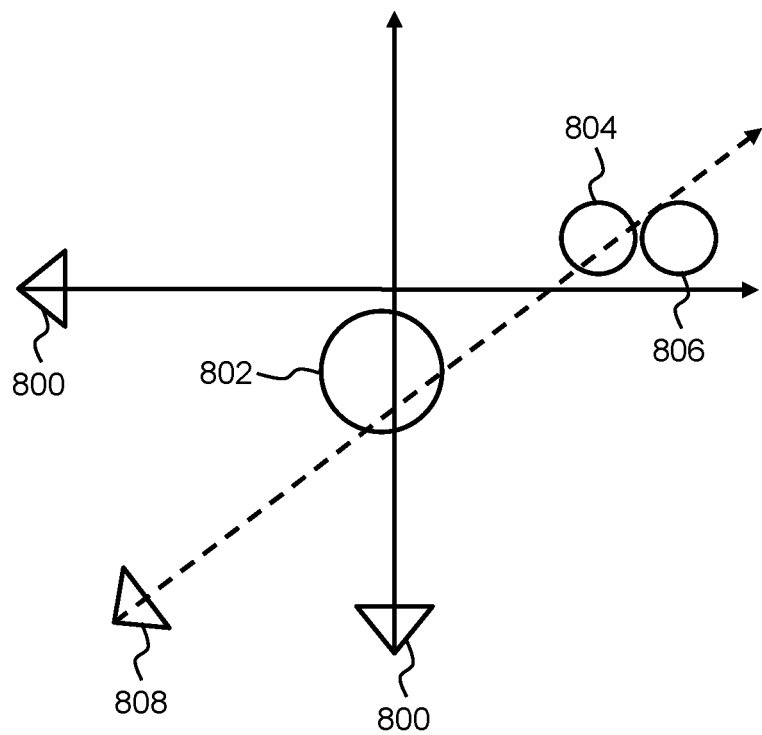
FIG. 8 shows a 3D scene with two source views and two target views.
Figure 8:
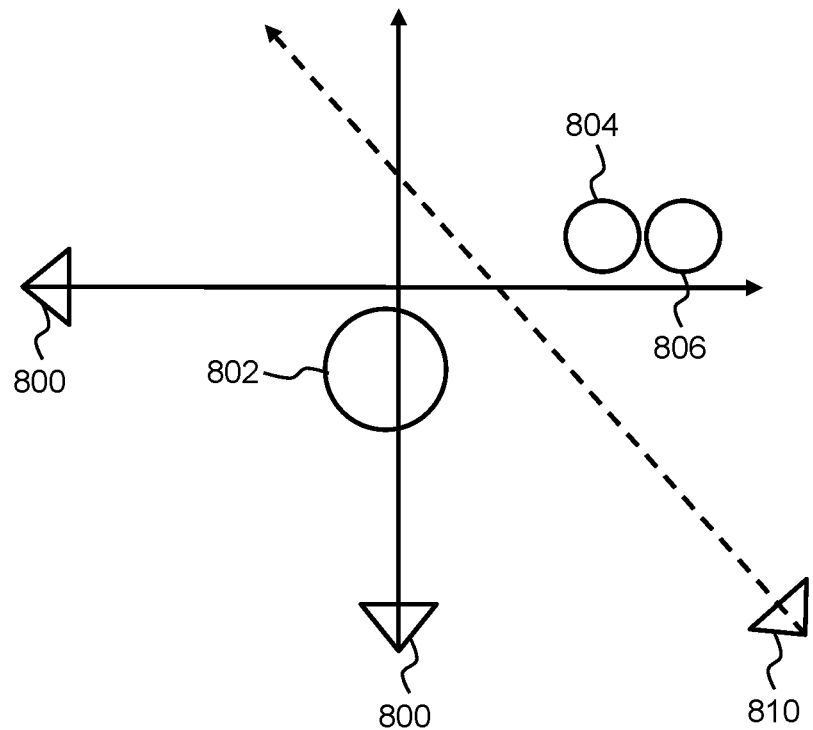

FIG. 8 shows a 3D scene with two source views 800 and two target views 808 and 810. FIG. 8(*a*) shows a first target viewpoint 808 and FIG. 8(*b*) shows a second viewpoint 810. FIG. 8 illustrates the need for sorting patches 110 (FIG. 1) at the client side based on the coordinates of the target views 808 or 810. Target views 808 and 810 may also be called virtual viewpoints or virtual views.

For the first target view 808 shown in FIG. 8(*a*), objects 804 and 806 may end up in the same patch group which is warped and blended first. Object 802 is closest to the coordinates of the first target view 808 and is hence warped, blended and composited last.

However, this is different for the second target view 810 shown in FIG. 8(*b*). For the second target view 810, objects 802 and 804 are warped, blended and composited first and object 806 is warped blended and composited last as object 806 is closer to the second target view 810 than objects 802 and 804.

Metadata

Metadata may also be stored for each patch 110. For example, for each patch 110, a source view identifier, a source view position and size ($u_{0,v}$, $v_{0,v}$, $w_v$, $h_v$) and an atlas 112 (FIG. 1) position and size ($u_{0,a}$, $v_{0,a}$, $w_a$, $h_a$) may be stored.

Let ($u_{0,a}$, $v_{0,a}$) represent the lower left corner of a rectangular patch 110 in the atlas coordinates. Thus, it is only necessary to sample atlas coordinates that lie inside the rectangle that is being warped for a given patch size. Given that the normalized (u, v) coordinates lie in the domain [0,1], the normalized atlas coordinates ($u_a$, $v_a$) of a point (u, v) of the rectangle can be calculated as:

$$u_a = u_{0,a} + uw_a$$

$$v_a = v_{0,a} + vh_a$$

The atlas coordinates ($u_a$, $v_a$) are used to access the depth value inside the patch depth maps 306 (FIG. 3) during a vertex shader stage and interpolate the color and transparency by passing the atlas coordinates to a fragment shader.

However, to warp the patch 110 to an output view it may be necessary to know the rectangle source view image 102 (FIG. 1) coordinates. Given that the normalized (u, v) coordinates lie in the domain [0,1], the normalized atlas coordinates ($u_v$, $v_v$) of a point (u, v) of the rectangle can be calculated as:

$$u_v = u_{0,v} + uw_v$$

$$v_v = v_{0,v} + vh_v$$

Note that because normalized coordinates are used, the source view images 102 and/or depth maps can have less or more pixels than stored in the atlas 112. With a fixed pixel budget in the atlas 112, patches 110 can be scaled to always fit.

The skilled person would be readily capable of developing a processor for carrying out any herein described method. Thus, each step of a flow chart may represent a different action performed by a processor, and may be performed by a respective module of the processing processor.

As discussed above, the system makes use of a processor to perform the data processing. The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method comprising:
obtaining a plurality of source view images,
   wherein each of the plurality of source view images has a source view depth map,
   wherein the plurality of source view images and the plurality of source view depth maps are representative of a three dimensional scene,
   wherein the three dimensional scene is obtained from a plurality of sensors;
segmenting foreground objects in the three dimensional scene from the source view images;
generating at least one patches for each of the plurality of source view images,
   wherein each the at least one patches comprise at least one foreground object,
   wherein each patch of the at least one patches corresponds to a foreground object,
   wherein each of the plurality of patches comprises a patch texture image, a patch depth map and a patch transparency map,
   wherein each patch is based on a portion of the each of the plurality of source view images,
   wherein the portion of the source view image is smaller than the source view image;
obtaining a background model, wherein the background model comprises at least one background depth map and background texture data; and
generating an atlas, wherein the atlas is based on the patch texture images, the patch depth maps, the patch transparency maps and the background model.

2. The method of claim 1, further comprising obtaining a plurality of background depth maps of the three dimensional scene,
   wherein the plurality of background depth maps are representative of a background of the three dimensional scene,
   wherein each of the plurality of background depth maps comprises depth data of the background from a particular orientation,
   wherein the segmenting is based on a difference between a background depth map and a corresponding source view depth map,
   wherein the corresponding source view depth map is one of the plurality of source view depth maps.

3. The method of claim 1, wherein detecting foreground objects comprises:
subtracting each of a plurality of background depth maps from each corresponding source view depth map, so as to produce a plurality of difference images, wherein the corresponding source view depth map is one of the plurality of source view depth maps;
thresholding the plurality of difference images,
   wherein thresholding comprises comparing the pixel values of the difference images with a threshold value so as to produce a plurality of threshold maps,
   wherein each of the plurality of threshold maps differentiate between the background and the foreground objects;
identifying pixels in the plurality of source view depth maps corresponding to depth steps, wherein depth steps are defined by the differences between neighboring depth values in a source view depth map larger than a depth threshold value;
marking the depth steps in the plurality of threshold maps as background so as to differentiate the foreground objects from each other; and
generating bounding boxes around the foreground objects based on the plurality of threshold maps.

4. The method of claim 3, wherein detecting foreground objects further comprises enlarging the bounding boxes so as to include regions of the foreground objects in the plurality of threshold maps below the threshold value.

5. The method of claim 1, further comprising adapting pixel depth values of the at least one patches depth map such that all of the pixel depth values of the patch depth map consist of values equal to or lower than the depth values of the corresponding foreground object.

6. The method of claim 1, further comprising:
identifying a portion of the plurality of patches from the patches corresponding to a first foreground object, wherein the identifying is based on identifying the patch depth maps of the patches within an object depth range; and
correcting the patch depth maps of the portion of the plurality of patches such that they correspond to an object location in the three dimensional scene.

7. The method of claim 1, further comprising pruning the plurality of patches based on a measure of consistency.

8. The method of claim 1, wherein the generating comprises:
identifying a sub-region in a first source view depth map of the plurality of source view depth maps;
determining a number of depth surfaces of different depths present in the sub-region; and
generating a patch for each depth surface in the sub-region, wherein each patch comprises a different patch transparency map.

9. A computer program stored on a non-transitory medium, wherein the computer program when executed on a processor performs the method as claimed in claim 1.

10. An apparatus comprising:
a plurality of sensors, wherein the plurality of sensors are arranged to obtain source view images source view depth maps; and
a processor circuit,
wherein the processor circuit is arranged to obtain a plurality of source view images from the plurality of sensors,
wherein each of the plurality of source view images has a source view depth map,
wherein the plurality of source view images and the plurality of source view depth maps are representative of a three dimensional scene;
segmenting foreground objects in the three dimensional scene from the source view images and/or the plurality of source view depth maps;
wherein the processor circuit is arranged to generate at least one patches for each of the plurality of source view images,
wherein each the at least one patches comprise at least one foreground object,
wherein each patch of the at least one patches corresponds to a foreground object,
wherein each of the plurality of patches comprises a patch texture image, a patch depth map and a patch transparency map,
wherein each patch is based on a portion of the source view image,
wherein the portion of the source view image is smaller than the source view image;
wherein the processor circuit is arranged to obtain a background model,
wherein the background model comprises at least one background depth map and background texture data; and
wherein the processor circuit is arranged to generate an atlas,
wherein the atlas is based on the patch texture images, the patch depth maps, the patch transparency maps and the background model.

11. The apparatus of claim 10,
wherein the processor circuit is arranged to obtain a plurality of background depth maps of the three dimensional scene,
wherein the plurality of background depth maps are representative of a background of the three dimensional scene,
wherein each of the plurality of background depth maps comprises depth data of the background from a particular orientation,
wherein the segmenting is based on a difference between a background depth map and a corresponding source view depth map,
wherein the corresponding source view depth map is one of the plurality of source view depth maps.

12. The apparatus of claim 10, wherein detecting foreground objects comprises:
subtracting each of a plurality of background depth maps from each corresponding source view depth map, so as to produce a plurality of difference images, wherein the corresponding source view depth map is one of the plurality of source view depth maps;
thresholding the plurality of difference images,
wherein thresholding comprises comparing the pixel values of the difference images with a threshold value so as to produce a plurality of threshold maps,
wherein each of the plurality of threshold maps differentiate between the background and the foreground objects;
identifying pixels in the plurality of source view depth maps corresponding to depth steps, wherein depth steps are defined by the differences between neighboring depth values in a source view depth map larger than a depth threshold value;
marking the depth steps in the plurality of threshold maps as background so as to differentiate the foreground objects from each other; and
generating bounding boxes around the foreground objects based on the plurality of threshold maps.

13. The apparatus of claim 12, wherein detecting foreground objects further comprises enlarging the bounding boxes so as to include regions of the foreground objects in the plurality of threshold maps below the threshold value.

14. The apparatus of claim 10, wherein the processor circuit is arranged to adapt pixel depth values of the at least one patches depth map such that all of the pixel depth values of the patch depth map consist of values equal to or lower than the depth values of the corresponding foreground object.

15. The apparatus of claim 10,
wherein the processor circuit is arranged to identify a portion of the plurality of patches from the patches corresponding to a first foreground object, wherein the identifying is based on identifying the patch depth maps of the patches within an object depth range,
wherein the processor circuit is arranged to correct the patch depth maps of the portion of the plurality of patches such that they correspond to an object location in the three dimensional scene.

16. A method comprising:
receiving an atlas, wherein the atlas comprises a plurality of patches and a background model of a three dimensional scene,
wherein each patch of the plurality of patches corresponds to a foreground object,
wherein each patch of the plurality of patches comprises a patch texture image, a patch depth map and a patch transparency map,
wherein the patch texture image, the patch depth map and the patch transparency map are derived from a plurality of source view images and the plurality of source view depth maps,
wherein each patch of the plurality of patches is based on a portion of the each of the plurality of source view images,
wherein the portion of the source view image is smaller than the source view image;
receiving a virtual viewpoint within the three dimensional scene;

sorting the patches based on the difference between the position of the virtual viewpoint and the position of the foreground objects corresponding to each patch of the plurality of patches; and rendering the background model and the sorted patches.

17. The method of claim 16, further comprising grouping the patches based on the position of the corresponding foreground objects relative to the virtual viewpoint.

18. The method of claim 17, wherein rendering the background model and the sorted patches comprises:

rendering the background model;

warping and/or blending a portion of the plurality of patches;

compositing the warped and/or blended first patch group onto the rendered background model;

warping and/or blending a second patch group, wherein the position of the foreground objects corresponding to the second patch group relative to the virtual viewpoint is closer to the virtual viewpoint than the position of the foreground objects corresponding to the first patch group; and compositing the warped and/or blended second patch group onto the warped and/or blended first patch group.

19. A computer program stored on a non-transitory medium, wherein the computer program when executed on a processor performs the method as claimed in claim 16.

20. A method comprising:

obtaining a plurality of source view images, wherein each of the plurality of source view images has a source view depth map, wherein the plurality of source view images and the plurality of source view depth maps are representative of a three dimensional scene, wherein the three dimensional scene is obtained from a plurality of sensors;

segmenting foreground objects in the three dimensional scene from the plurality of source view depth maps;

generating at least one patches for each of the plurality of source view images, wherein each the at least one patches comprise at least one foreground object, wherein each patch of the at least one patches corresponds to a foreground object, wherein each of the plurality of patches comprises a patch texture image, a patch depth map and a patch transparency map, wherein each patch is based on a portion of the each of the plurality of source view images, wherein the portion of the source view image is smaller than the source view image;

obtaining a background model, wherein the background model comprises at least one background depth map and background texture data; and generating an atlas, wherein the atlas is based on the patch texture images, the patch depth maps, the patch transparency maps and the background model.

* * * * *